(12) United States Patent
Chang

(10) Patent No.: US 11,082,674 B2
(45) Date of Patent: Aug. 3, 2021

(54) IMAGE MAPPING PLAYER AND PIXEL DEBUGGING METHOD

(71) Applicant: StrongLED Lighting Systems (Suzhou) Co., Ltd., Suzhou (CN)

(72) Inventor: Chia-Jui Chang, Suzhou (CN)

(73) Assignee: STRONGLED LIGHTING SYSTEMS (SUZHOU) CO., LTD., Jiangsu (CN)

( * ) Notice: Subject to any disclaimer, the term of this patent is extended or adjusted under 35 U.S.C. 154(b) by 0 days.

(21) Appl. No.: 16/971,189

(22) PCT Filed: Nov. 11, 2019

(86) PCT No.: PCT/CN2019/116997
§ 371 (c)(1),
(2) Date: Aug. 19, 2020

(87) PCT Pub. No.: WO2021/000486
PCT Pub. Date: Jan. 7, 2021

(65) Prior Publication Data
US 2021/0211622 A1 Jul. 8, 2021

(30) Foreign Application Priority Data
Jul. 3, 2019 (CN) .......................... 201910594475.0

(51) Int. Cl.
H04N 9/31 (2006.01)
(52) U.S. Cl.
CPC ......... H04N 9/3191 (2013.01); H04N 9/3182 (2013.01)

(58) Field of Classification Search
CPC ........................... H04N 9/3191; H04N 9/3182
See application file for complete search history.

(56) References Cited

U.S. PATENT DOCUMENTS 7,256,791 B2 * 8/2007 Sullivan ................ G06T 15/405
345/545
7,404,645 B2 * 7/2008 Margulis ................ G03B 21/20
348/630

(Continued)

FOREIGN PATENT DOCUMENTS

| CN | 109194994 A | 1/2019 |
| CN | 109741718 A | 5/2019 |
| CN | 110213554 A | 9/2019 |

*Primary Examiner* — Brian P Yenke
(74) *Attorney, Agent, or Firm* — Sinorica, LLC

(57) ABSTRACT

An image mapping player includes an image mapping module for creating a mapping relation between each pixel of an image of a video to be mapped and each pixel of an image to be displayed and displaying the image according to the mapping relation, a brightness adjustment module for adjusting the brightness of the displayed image brightness, a controller selection module for selecting a controller type, a channel selection module for selecting a channel; a RB reverse selection module for selecting a color component R and a color component B whether or not applicable for reversing the image, a white light setting module, for selecting a white light mod, and a port brightness adjustment module for adjusting the brightness of a selected port. The invention also discloses a pixel debugging method by using the image mapping player.

10 Claims, 4 Drawing Sheets

Image Mapping Player

- Image mapping module1
- Brightness adjustment module2
- Controller selection module3
- Channel selection module4
- RB reverse selection module5
- White light setting module6
- Port brightness adjustment module7
- Pixel adjustment module8
- Parameter storage module9

(56) References Cited

U.S. PATENT DOCUMENTS

| | | | | |
|---|---|---|---|---|
| 7,436,996 | B2* | 10/2008 | Ben-Chorin | G09G 5/02 345/590 |
| 8,115,787 | B2* | 2/2012 | Ben-Chorin | H04N 1/6058 345/690 |
| 8,599,226 | B2* | 12/2013 | Ben-Chorin | H04N 1/6058 345/690 |
| 8,736,630 | B2* | 5/2014 | Zhang | G09G 3/2003 345/589 |
| 8,890,884 | B2* | 11/2014 | Zhang | G09G 3/2003 345/589 |
| 9,462,243 | B2* | 10/2016 | Lin | G09G 3/3426 |
| 9,514,508 | B2* | 12/2016 | Ballestad | G06K 9/6202 |
| 9,792,847 | B2* | 10/2017 | Dawson | H04N 9/3182 |
| 9,936,182 | B2* | 4/2018 | Ohsawa | H04N 17/02 |
| 10,101,957 | B2* | 10/2018 | Yamamoto | G03B 21/28 |
| 10,630,948 | B2* | 4/2020 | Post | H04N 9/3182 |
| 10,795,252 | B2* | 10/2020 | Dawson | G03B 21/60 |
| 10,798,331 | B2* | 10/2020 | Dawson | G03B 21/60 |
| 2014/0267451 | A1* | 9/2014 | Kumamoto | H04N 9/3155 345/690 |
| 2014/0307102 | A1* | 10/2014 | Chang | H04N 9/3191 348/175 |
| 2015/0077640 | A1* | 3/2015 | Kanda | H04N 9/3182 348/713 |
| 2016/0284054 | A1* | 9/2016 | Koskinen | H04N 9/04515 |
| 2016/0286184 | A1* | 9/2016 | Liu | H04N 9/3185 |
| 2018/0262729 | A1* | 9/2018 | Ohki | G09G 5/005 |
| 2020/0099905 | A1* | 3/2020 | Post | G09G 3/2003 |
| 2020/0193935 | A1* | 6/2020 | Van De Kerkhof | H04N 21/434 |

* cited by examiner

IMAGE MAPPING PLAYER AND PIXEL DEBUGGING METHOD

FIELD OF THE INVENTION

The present invention relates to the technical field of video projection, and more particularly to an image mapping player and a pixel debugging method.

BACKGROUND OF THE INVENTION

When videos are projected onto a building by lamps, the image of an original video is usually not projected onto the building in the scale of 1:1 for the consideration of cost. A larger number of pixels of the video requires more lamps and controllers and thus incurs a higher cost. In general, a portion of pixels is taken for the projection, as long as the image of the original video can be seen clearly. The same theory exactly applies to image mapping players. Firstly, a lighting file generated by lighting software is loaded, and then point bits of the original video are rearranged according to a new rule based on the mapping relation of a midpoint bit of the lighting file.

Chinese Patent Publication No. CN109194994A has disclosed an image mapping player, wherein a fixed-point pixel of an image is used to represent the value of a parameter of an image of a video, but the image mapping player has limited functions and cannot adjust the video brightness for one or more ports. In addition, the adjustment of parameters is convenient, and the versatility is low. The parameters of the image mapping player may have to be revised when a condition is changed.

SUMMARY OF THE INVENTION

In view of the drawbacks of the conventional image mapping player, the present invention provides an image mapping player with multiple functions, good versatility and flexible use is applicable for a mixed use of lamps in factory and convenient for on-site staff to use and debug, and also provides a pixel debugging method by using the image mapping player.

To achieve the aforementioned and other objectives, the present invention discloses an image mapping player comprising: an image mapping module, for creating a mapping relation between each pixel of an image of a video to be mapped and each pixel of an image to be displayed, and displaying the image according to the mapping relation; a brightness adjustment module, for adjusting the brightness of the displayed image brightness; a controller selection module, for selecting a controller type; a channel selection module, for selecting a channel; a RB reverse selection module, for selecting a color component R and a color component B whether or not applicable for reversing the image; a white light setting module, for selecting a white light mode; and a port brightness adjustment module, for adjusting the brightness of a selected port.

Further, the brightness adjustment module comprises: an overall brightness adjustment unit, for adjusting the brightness of the whole displayed image; a color component R brightness adjustment unit, for adjusting the brightness of the color component R of the displayed image; a color component G brightness adjustment unit, for adjusting the brightness of the color component G of the displayed image; a color component B brightness adjustment unit, for adjusting the brightness of the color component B of the displayed image; and a color component W brightness adjustment unit, for adjusting the brightness of the color component W of the displayed image.

Further, the port brightness adjustment module comprises: a port selection unit, used in a port that requires a brightness adjustment in the selected image; and a color component brightness adjustment unit, for adjusting the brightness of the color components R, G, B, and W of the selected port.

Further, the port selection unit supports the selection of a single port and a plurality of ports, and also supports the deletion of a single selected port and a plurality of selected ports.

Further, the image mapping player further comprises a pixel adjustment module for debugging a pixel and a run point, and the pixel adjustment module comprises: a pixel selection unit, for selecting a pixel by a port number and an index number; a color component adjustment unit, for adjusting the brightness of a plurality of color components R, G, B, and W of a pixel; wherein, the pixel selection unit being used to select a pixel that is required to be debugged, and then a color component adjustment unit being provided for adjusting the brightness of the color components of the pixel to determine whether or not the lamp of the pixel is working normally; and the pixel selection unit switching an index number to adjust the selected pixel, and using the ON/OFF of the pixel to achieve a run point.

Further, the white light mode comprises a pure white mode, a mixed white mode, a constant white light mode, a white-color separate mode; in the pure white mode, only the white light displayed by the color component W is displayed; in the mixed white mode, the white light displayed by the color component RGB and the white light displayed by the white light and color component W are displayed simultaneously; in the constant white light mode, the color component W always displays according to a predetermined brightness; the white-color separate mode comprising a downward point obtaining mode and a rightward point obtaining mode, wherein in the downward point obtaining mode, a display area comprises a first area and a second area that display the same content, and the first area is full color and displays the color components RGB, and the second area is grayish white and uses a color component W for light supplement, and the second area is disposed under the first area; in the rightward point obtaining mode, a display area comprises a first area and a second area that display the same content, and the first area is full color and displays the color components RGB, and the second area is grayish white and uses a color component W for light, and the second area is disposed on the right side of the first area.

Further, the controller type comprises a standard mode, an extended mode, and a serial mode.

Further, in the standard mode, a single port of the controller has a maximum number of pixels equal to 170; in the extended mode, a single port of the controller has a maximum number of pixels equal to 256; and in the serial mode, a single port of the controller has a maximum number of pixels equal to 512.

Further, the image mapping player comprises a parameter storage module for automatically storing the parameter information set for the brightness adjustment module, the controller selection module, the channel selection module, the RB reverse selection module, the white light setting module, the port brightness adjustment module, and automatically loading the previously set parameter information when the image mapping player is turned on next time.

The present invention also discloses a pixel debugging method by using the image mapping player, and the pixel debugging method comprises the following steps (S1~S3):

S1: Start a pixel adjustment module to adjust the overall brightness of a displayed image to 0, so that the displayed image is all black.

S2: Use a pixel selection unit to input a pixel selected by a port number and an index number, and light up the selected pixel.

S3: Use a color component adjustment unit to adjust the pixel brightness of a plurality of color components R, G, B, and W for debugging, so as to determine whether or not a lamp of the pixel is operated normally.

The image mapping player of the present invention supports the debugging of the overall video brightness and the adjustment of video brightness for one or more ports and also self-adjusts the number of channels, the controller type, the reverse of the color components R, B, and the white light mode, and switches between different white light modes and numbers of channels. In the meantime, the parameter storage module is provided for automatically storing the parameter information set for the brightness adjustment module, the controller selection module, the channel selection module, the RB reverse selection module, the white light setting module, the port brightness adjustment module, and automatically loading the previously set parameter information when the image mapping player is turned on next time. The invention has the features of multiple functions, good versatility and flexible use is applicable for a mixed use of lamps in factory and convenient for on-site staff to use and debug In addition, the image mapping player of the present invention uses the pixel adjustment module to debug a pixel and a run point, the pixel selection unit to select a pixel to be debugged, the color component adjustment unit to adjust the brightness of the color components of the pixel to determine whether or not the lamp of the pixel is working normally, the pixel selection unit to switch an index number to adjust the selected pixel, and the ON/OFF of the pixel to achieve the run point.

DESCRIPTION OF THE PREFERRED EMBODIMENTS

The objectives, technical characteristics and effects of the present invention will become apparent with the detailed description of preferred embodiments accompanied with the illustration of related drawings. It is intended that the embodiments and drawings disclosed herein are to be considered illustrative rather than restrictive.

Figure 1:
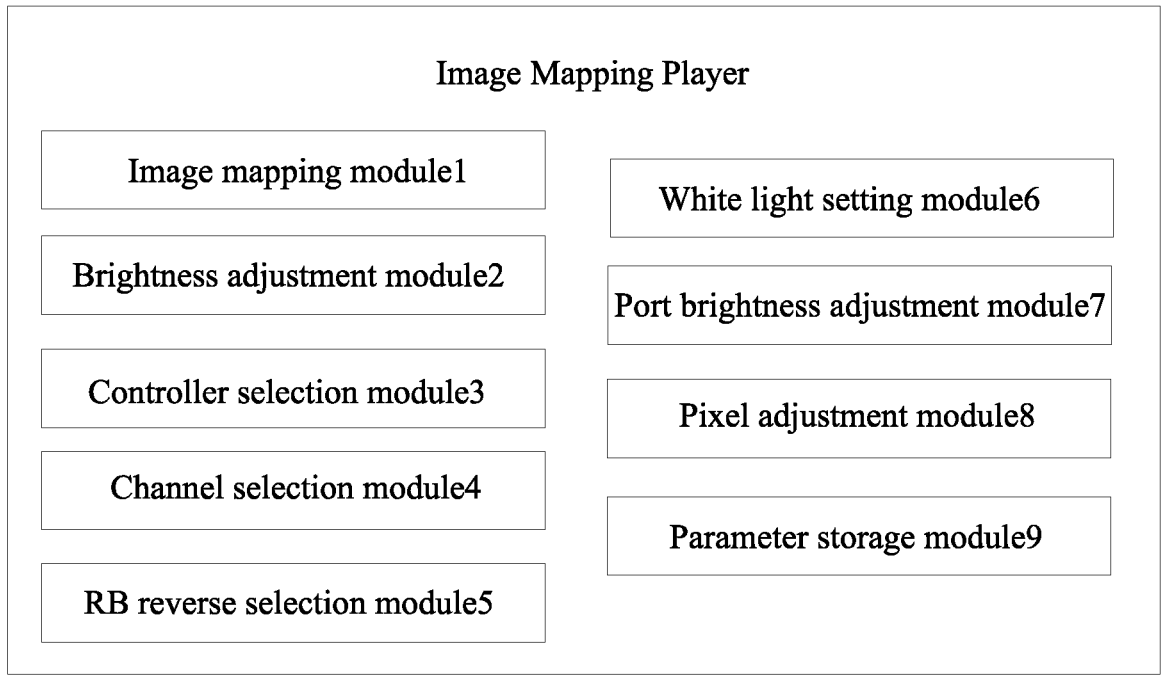
FIG. 1 is a schematic system block diagram of an image mapping player of the present invention.
Figure 2:
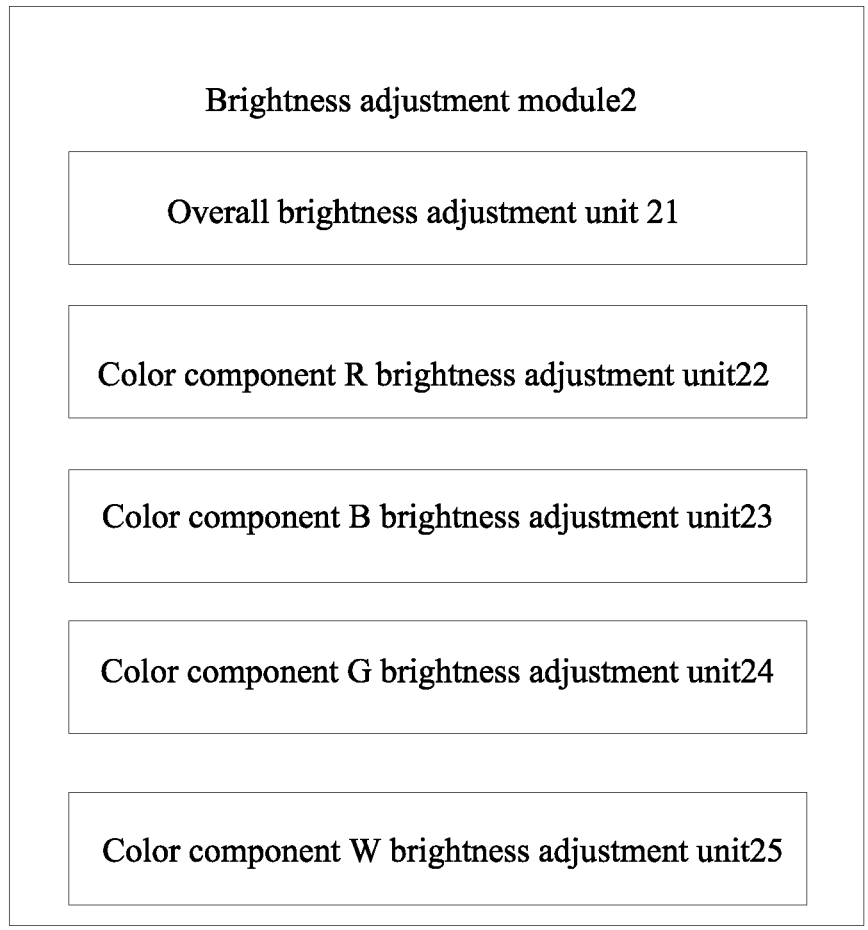
FIG. 2 is a schematic block diagram of a brightness adjustment module of the present invention.
Figure 3:
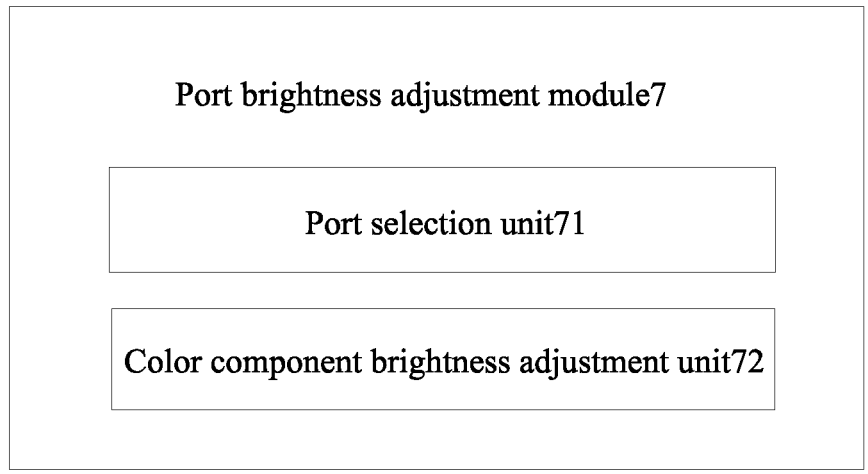
FIG. 3 is a schematic block diagram of a port brightness adjustment module of the present invention.
Figure 4:
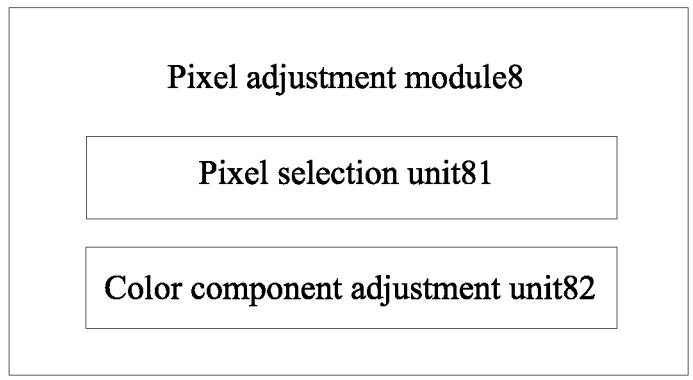
FIG. 4 is a schematic block diagram of a pixel adjustment module of the present invention.

With reference to FIGS. 1 to 4 for an image mapping player of the present invention, the image mapping player comprises the following elements:

An image mapping module 1 is provided for creating a mapping relation between each pixel of an image of a video to be mapped and each pixel of an image to be displayed, and displaying the image according to the mapping relation.

A brightness adjustment module 2 is provided for adjusting the brightness of the displayed image. In this embodiment, the brightness adjustment module 2 comprises the following elements:

An overall brightness adjustment unit 21 is provided for adjusting the brightness of the whole displayed image.

A color component R brightness adjustment unit 22 is provided for adjusting the brightness of a color component R of the image.

A color component G brightness adjustment unit 23 is provided for adjusting the brightness of a color component G of the image.

A color component B brightness adjustment unit 24 is provided for adjusting the brightness of a color component B of the image.

A color component W brightness adjustment unit 25 is provided for adjusting the brightness of a color component W of the image.

A controller selection module 3 is provided for selecting a controller type. In this embodiment, the controller type comprises a standard mode, an extended mode, and a serial mode. In the standard mode, a single port of the controller has a maximum number of pixels equal to 170; in the extended mode, a single port of the controller has a maximum number of pixels equal to 256; and in the serial mode, a single port of the controller has a maximum number of pixels equal to 512.

A channel selection module 4 is provided for selecting a channel.

A RB reverse selection module 5 is provided for selecting a color component R and a color component B whether or not applicable for reversing the image.

A white light setting module 6 is provided for selecting a white light mode. In this embodiment, the white light mode comprises a pure white mode, a mixed white mode, a constant white light mode, and a white-color separate mode.

In the pure white mode, only the white light displayed by the color component W s displayed.

In the mixed white mode, the white light displayed by the color components RGB and the white light displayed by the white light and color component W are displayed simultaneously.

In the constant white light mode, the color component W always displays according to a predetermined brightness.

The white-color separate mode comprises a downward point obtaining mode and a rightward point obtaining mode.

In the downward point obtaining mode, a display area comprises a first area and a second area that display the same content, and the first area is full color and displays the color components RGB, and the second area is greyish white and uses the color component W for light supplement, and the second area is disposed under the first area.

In the rightward point obtaining mode, the display area comprises a first area and a second area that display the same content, and the first area is full color and displays the color components RGB, and the second area is greyish white and uses the color component W for light supplement, and the second area is disposed on the right side of the first area.

A port brightness adjustment module 7 is provided for adjusting the brightness of the selected port, and the port brightness adjustment module can be used to adjust the brightness of a portion of the image. In this embodiment, the port brightness adjustment module 7 comprises the following elements:

A port selection unit 71 is provided for selecting a port that requires an adjustment of the brightness in the selected image.

A color component brightness adjustment unit 72 is provided for adjusting the brightness of the color components R, G, B, W of the selected port; wherein the port selection unit 71 supports the selection of one or more ports, and also supports the deletion of one or more selected ports.

A pixel adjustment module 8 is provided for debugging a pixel and a run point, and the pixel adjustment module 8 comprises: a pixel selection unit 81 for selecting a pixel by a port number and an index number; a color component adjustment unit 82 for adjusting the brightness of the color components R, G, B, W of the selected pixel, wherein when a pixel is debugged, the pixel selection unit 81 selects a pixel to be debugged and then uses a color component adjustment unit 82 to adjust the brightness of the color components of the pixel, so as to determine whether or not a lamp of the pixel is working normally; a pixel selection unit 81 for switching an index number to adjust the selected pixel and using the ON/OFF of the pixel to achieve the run point; and a parameter storage module 9 for automatically storing the parameter information set for the brightness adjustment module, the controller selection module, the channel selection module, the RB reverse selection module, the white light setting module, the port brightness adjustment module, and automatically loading the previously set parameter information when the image mapping player is turned on next time.

The present invention further provides a pixel debugging method by using the aforementioned image mapping player, and the method comprises the following steps (S1~S3):

S1: Start a pixel adjustment module to adjust the overall brightness of a displayed image to 0, so that the displayed image is all black.

S2: Use a pixel selection unit to input a pixel selected by a port number and an index number, and light up the selected pixel.

S3: Use a color component adjustment unit to adjust the pixel brightness of a plurality of color components R, G, B, and W for debugging, so as to determine whether or not a lamp of the pixel is operated normally.

The image mapping player of the present invention supports the debugging of the overall video brightness and the adjustment of video brightness for one or more ports and also self-adjusts the number of channels, the controller type, the reverse of the color components R, B, and the white light mode, and switches between different white light modes and numbers of channels. In the meantime, the parameter storage module is provided for automatically storing the parameter information set for the brightness adjustment module, the controller selection module, the channel selection module, the RB reverse selection module, the white light setting module, the port brightness adjustment module, and automatically loading the previously set parameter information when the image mapping player is turned on next time. The invention has the features of multiple functions, good versatility and flexible use is applicable for a mixed use of lamps in factory and convenient for on-site staff to use and debug. In addition, the image mapping player of the present invention uses the pixel adjustment module for debugging pixel and run point, the pixel selection unit for selecting a pixel required to be debugged, the color component adjustment unit to adjust the brightness of the color components of the pixel in order to determine whether or not a lamp of the pixel is working normally, the pixel selection unit to switch the index number to adjust the selected pixel, and the ON/OFF of the pixel to achieve the run point.

While the present invention has been described by means of specific embodiments, these embodiments are intended for illustrating the invention but not for limiting the scope of the invention. It is noteworthy that numerous modifications and variations could be made thereto by those skilled in the art without departing from the scope and spirit of the invention as set forth in the claims.

What is claimed is:

1. An image mapping player, comprising:
   an image mapping module, for creating a mapping relation between each pixel of an image of a video to be mapped and each pixel of an image to be displayed, and displaying the image according to the mapping relation;
   a brightness adjustment module, for adjusting the brightness of the displayed image brightness;
   a controller selection module, for selecting a controller type;
   a channel selection module, for selecting a channel;
   a RB reverse selection module, for selecting a color component R and a color component B whether or not applicable for reversing the image;
   a white light setting module, for selecting a white light mode; and
   a port brightness adjustment module, for adjusting the brightness of a selected port.

2. The image mapping player as claimed in claim 1, wherein the brightness adjustment module comprises:
   an overall brightness adjustment unit, for adjusting the brightness of the whole displayed image;
   a color component R brightness adjustment unit, for adjusting the brightness of the color component R of the displayed image;
   a color component G brightness adjustment unit, for adjusting the brightness of the color component G of the displayed image;
   a color component B brightness adjustment unit, for adjusting the brightness of the color component B of the displayed image; and
   a color component W brightness adjustment unit, for adjusting the brightness of the color component W of the displayed image.

3. The image mapping player as claimed in claim 2, wherein the port brightness adjustment module comprises:
   a port selection unit, used in a port that requires a brightness adjustment in the selected image; and
   a color component brightness adjustment unit, for adjusting the brightness of the color components R, G, B, and W of the selected port.

4. The image mapping player as claimed in claim 3, wherein the port selection unit supports the selection of a single port and a plurality of ports, and also supports the deletion of a single selected port and a plurality of selected ports.

5. The image mapping player as claimed in claim 1, further comprising a pixel adjustment module, for debugging a pixel and a run point, and the pixel adjustment module comprising:
   a pixel selection unit, for selecting a pixel by a port number and an index number;
   a color component adjustment unit, for adjusting the brightness of a plurality of color components R, G, B, and W of a pixel;
   the pixel selection unit being used to select a pixel that is required to be debugged, and then a color component adjustment unit being provided for adjusting the brightness of the color components of the pixel to determine whether or not the lamp of the pixel is working normally; and the pixel selection unit switching an index number to adjust the selected pixel, and using the ON/OFF of the pixel to achieve the run point.

6. The image mapping player as claimed in claim 1, wherein the white light mode comprises a pure white mode, a mixed white mode, a constant white light mode, a white-color separate mode;

in the pure white mode, only the white light displayed by the color component W is displayed;

in the mixed white mode, the white light displayed by the color component RGB and the white light displayed by the white light and color component W are displayed simultaneously;

in the constant white light mode, the color component W always displays according to a predetermined brightness;

the white-color separate mode comprising a downward point obtaining mode and a rightward point obtaining mode, wherein in the downward point obtaining mode, a display area comprises a first area and a second area that display the same content, and the first area is full color and displays the color components RGB, and the second area is grayish white and uses a color component W for light supplement, and the second area is disposed under the first area;

in the rightward point obtaining mode, a display area comprises a first area and a second area that display the same content, and the first area is full color and displays the color components RGB, and the second area is grayish white and uses a color component W for light, and the second area is disposed on the right side of the first area.

7. The image mapping player as claimed in claim 1, wherein the controller type comprises a standard mode, an extended mode, and a serial mode.

8. The image mapping player as claimed in claim 7, wherein: in the standard mode, a single port of the controller has a maximum number of pixels equal to 170; in the extended mode, a single port of the controller has a maximum number of pixels equal to 256; and in the serial mode, a single port of the controller has a maximum number of pixels equal to 512.

9. The image mapping player as claimed in claim 1, further comprising a parameter storage module for automatically storing the parameter information set for the brightness adjustment module, the controller selection module, the channel selection module, the RB reverse selection module, the white light setting module, the port brightness adjustment module, and automatically loading the previously set parameter information when the image mapping player is turned on next time.

10. A pixel debugging method using the image mapping player as claimed in claim 3 for pixel debugging, comprising the steps of:

S1: starting a pixel adjustment module to adjust the overall brightness of a displayed image to 0, so that the displayed image is all black;

S2: using a pixel selection unit to input a pixel selected by a port number and an index number, and light up the selected pixel;

S3: using a color component adjustment unit to adjust the pixel brightness of a plurality of color components R, G, B, and W for debugging, so as to determine whether or not a lamp of the pixel is operated normally.

* * * * *